(12) United States Patent
Koren

(10) Patent No.: US 8,037,080 B2
(45) Date of Patent: Oct. 11, 2011

(54) RECOMMENDER SYSTEM UTILIZING COLLABORATIVE FILTERING COMBINING EXPLICIT AND IMPLICIT FEEDBACK WITH BOTH NEIGHBORHOOD AND LATENT FACTOR MODELS

(75) Inventor: Yehuda Koren, Elizabeth, NJ (US)

(73) Assignee: AT&T Intellectual Property II, LP, Atlanta, GA (US)

( * ) Notice: Subject to any disclaimer, the term of this patent is extended or adjusted under 35 U.S.C. 154(b) by 525 days.

(21) Appl. No.: 12/182,464

(22) Filed: Jul. 30, 2008

(65) Prior Publication Data

US 2010/0030764 A1    Feb. 4, 2010

(51) Int. Cl.
*G06F 17/30* (2006.01)
(52) U.S. Cl. ......... 707/754; 707/608; 707/913; 707/915
(58) Field of Classification Search .................. 707/754, 707/608, 913, 915
See application file for complete search history.

(56) References Cited

U.S. PATENT DOCUMENTS

| | | | |
|---|---|---|---|
| 5,704,017 A | | 12/1997 | Heckerman et al. |
| 5,884,282 A | | 3/1999 | Robinson |
| 6,049,777 A | | 4/2000 | Sheena et al. |
| 6,092,049 A | | 7/2000 | Chislenko et al. |
| 7,225,182 B2 * | | 5/2007 | Paine et al. ................ 707/709 |
| 7,574,422 B2 * | | 8/2009 | Guan et al. .................. 1/1 |
| 7,584,171 B2 * | | 9/2009 | Guan et al. .................. 1/1 |
| 7,590,616 B2 * | | 9/2009 | Guan et al. .................. 1/1 |
| 2003/0051240 A1 * | | 3/2003 | Schaffer et al. ............ 725/34 |
| 2003/0055816 A1 * | | 3/2003 | Paine et al. ................ 707/3 |
| 2004/0243527 A1 | | 12/2004 | Gross |
| 2004/0260574 A1 | | 12/2004 | Gross |
| 2005/0246358 A1 | | 11/2005 | Gross |
| 2007/0078849 A1 | | 4/2007 | Slothouber |
| 2008/0120287 A1 * | | 5/2008 | Guan et al. ................ 707/5 |
| 2008/0120288 A1 * | | 5/2008 | Guan et al. ................ 707/5 |
| 2008/0120339 A1 * | | 5/2008 | Guan et al. ............ 707/104.1 |
| 2010/0262556 A1 * | | 10/2010 | Shaya et al. ............. 705/347 |
| 2010/0312613 A1 * | | 12/2010 | Gross ...................... 705/10 |

OTHER PUBLICATIONS

G. Takacs et al., "Major Components of the Gravity Recommendation System," SIGKDD Explorations vol. 9, Issue 2 2007, pp. 80-84.
R. Salakhutdinov et al., "Restricted Boltzmann Machines for Collaborative Filtering," Proc. 24th Annual International Conference on Machine Learning, Corvallis, OR, 2007, pp. 791-798.
A. Paterek, "Improving Regularized Singular Value Decomposition for Collaborative Filtering," Proc. KDD Cup and Workshop, San Jose, CA, 2007.

(Continued)

*Primary Examiner* — Frantz Coby
(74) *Attorney, Agent, or Firm* — Andrew Gust; Guntin Meles & Gust, PLC

(57) ABSTRACT

Example collaborative filtering techniques provide improved recommendation prediction accuracy by capitalizing on the advantages of both neighborhood and latent factor approaches. One example collaborative filtering technique is based on an optimization framework that allows smooth integration of a neighborhood model with latent factor models, and which provides for the inclusion of implicit user feedback. A disclosed example Singular Value Decomposition (SVD)-based latent factor model facilitates the explanation or disclosure of the reasoning behind recommendations. Another example collaborative filtering model integrates neighborhood modeling and SVD-based latent factor modeling into a single modeling framework. These collaborative filtering techniques can be advantageously deployed in, for example, a multimedia content distribution system of a networked service provider.

33 Claims, 4 Drawing Sheets

OTHER PUBLICATIONS

R. Bell et al., "Scalable Collaborative Filtering with Jointly Derived Neighborhood Interpolation Weights," IEEE International Conference on Data Mining (ICDM'07), 2007, pp. 43-52.

D. M. Blei et al., "Latent Dirichlet Allocation," Journal of Machine Learning Research vol. 3, 2003, pp. 993-1022.

R. M. Bell et al., "Modeling Relationships at Multiple Scales to Improve Accuracy of Large Recommender Systems," International Conference on Knowledge Discovery and Data Mining, San Jose, CA, 2007.

J. L. Herlocker et al., "Explaining Collaborative Filtering Recommendations," International Conference on Computer Supported Cooperative Work, 2000, Philadelphia, PA, pp. 241-250.

D. Goldberg et al., "Using Collaborative Filtering to Weave an Information Tapestry," Communications of the ACM, vol. 35, No. 12, 1992, pp. 61-70.

S. Deerwester et al., "Indexing by Latent Semantic Analysis," Journal of the Society for Information Science, vol. 41, 1990, pp. 391-407.

G. Linden et al., "Amazon.com Recommendations: Item-to-item Collaborative Filtering," IEEE Internet Computing vol. 7, 2003, pp. 76-80.

J. Bennet et al., "The Netflix Prize," KDD Cup and Workshop, 2007, www.netflixprize.com.

R. Salakhutdinov et al., "Probabilistic Matrix Factorization," Department of Computer Science, University of Toronto, pp. 1-8.

D.W. Oard et al., "Implicit Feedback for Recommender Systems," Digital Library Research Group, College of Library & Information Services, MD, 1998, pp. 31-36.

R. M. Bell et al., "Lessons from the Netflix Prize Challenge," SIGKDD Explorations, vol. 9, Issue 2, 2007, pp. 75-79.

T. Hofmann, "Latent Semantic Models for Collaborative Filtering," ACM Transactions on Information Systems, vol. 22, No. 1, 2004, pp. 89-115.

J. L. Herlocker et al., "An Algorithmic Framework for Performing Collaborative Filtering," Proc. 22nd ACM SIGIR Conference on Information Retrieval, Berkeley, CA, 1999, pp. 230-237.

B. Sarwar et al., "Item-based Collaborative Filtering Recommendation Algorithms," Proc. 10th International Conference on the World Wide Web, Hong Kong, 2001, pp. 285-295.

A. Das et al., "Google News Personalization: Scalable Online Collaborative Filtering," WWW 2007 / Track: Industrial Practice and Experience, May 8-12, 2007 Banff, Alberta, Canada, pp. 271-280.

B. M. Sarwar et al., "Application of Dimensionality Reduction in Recommender System—A Case Study," WEBKDD, 2000.

J. Canny, "Collaborative Filtering with Privacy via Factor Analysis," Proc. 25th ACM SIGIR Conf on Research and Development in Information Retrieval (SIGIR02), 2002, pp. 238-245.

N. Tintarev et al., "A Survey of Explanations in Recommender Systems," ICDE'07 Workshop on Recommender Systems and Intelligent User Interfaces, Istanbul, Turkey, 2007.

R. M. Bell et al., "Improved Neighborhood-based Collaborative Filtering," KDDCup'07, San Jose, California, Aug. 12, 2007.

B. Mehta et al., "Robust Collaborative Filtering," RecSys'07, Minneapolis, Minnesota, Oct. 19-20, 2007, pp. 49-56.

R. Bell et al., "Chasing $1,000,000: How We Won the Netflix Progress Prize," ASA Statistical and Computing Graphics Newsletter 18, 2007, 4-12.

G. Adomavicius et al., "Towards the Next Generation of Recommender Systems: A Survey of the State-of-the-Art and Possible Extensions," IEEE Transactions on Knowledge and Data Engineering 17, 2005, 634-749.

D. Kim et al "Collaborative Filtering Based on Iterative Principal Component Analysis," Expert Systems with Applications 28, 2005, 823-830.

S. Funk, "Netflix Update: Try This At Home," 2006, http://sifter.org/simon/journal/20061211.html.

* cited by examiner

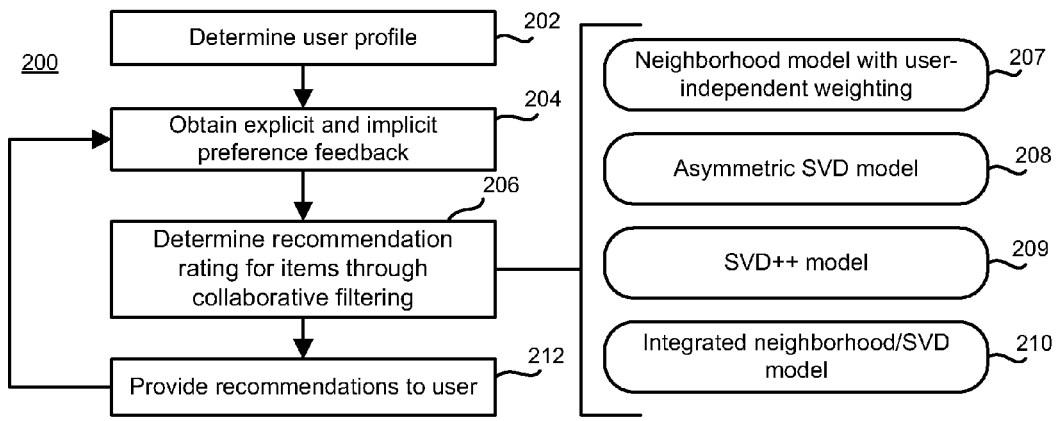
*FIG. 2*
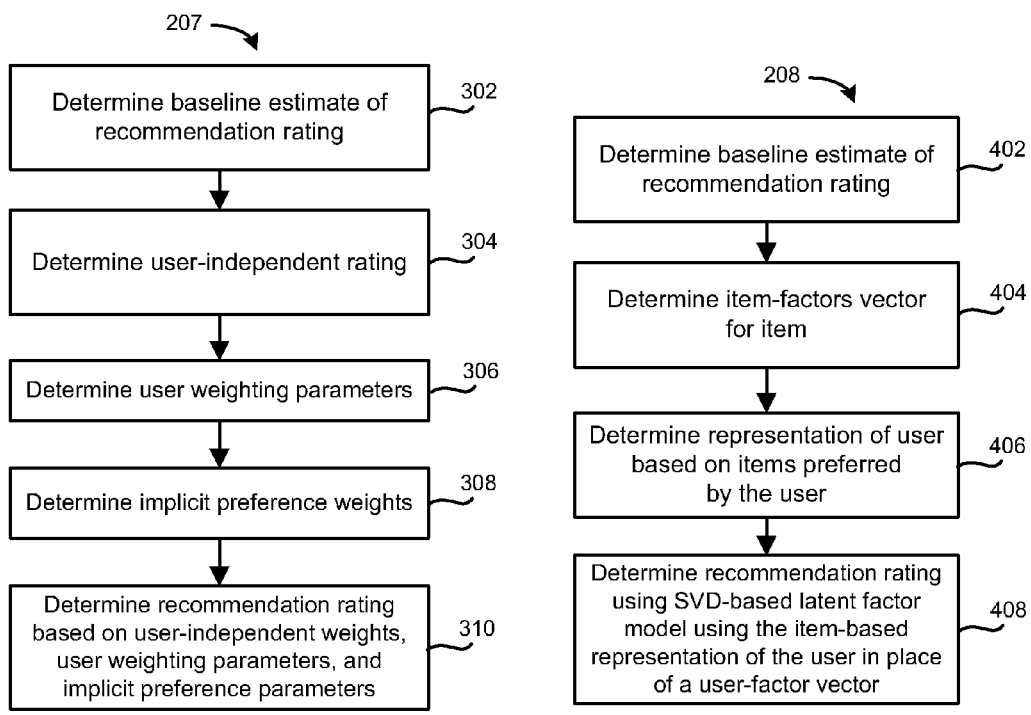
*FIG. 3*                    *FIG. 4*

RECOMMENDER SYSTEM UTILIZING COLLABORATIVE FILTERING COMBINING EXPLICIT AND IMPLICIT FEEDBACK WITH BOTH NEIGHBORHOOD AND LATENT FACTOR MODELS

FIELD OF THE DISCLOSURE

The present disclosure generally relates to recommender systems, and more particularly, to the use of collaborative filtering in recommender systems.

BACKGROUND

Modern consumers are inundated with choices. Electronic retailers and content providers often offer a substantial selection of products to meet a variety of special needs and tastes. Matching consumers with most appropriate products or services is not trivial, yet it is a key in enhancing user satisfaction and loyalty. This emphasizes the prominence of recommender systems, which provide personalized recommendations for products and services that suit a user's taste. Recommender systems generally use either of two strategies: content-based recommendations or collaborative filtering. The content-based approach profiles each user or product to associate users with matching products. For example, a movie profile might describe its genre, the participating actors, its box office popularity, etc. User profiles could include demographic information or answers to a suitable questionnaire. As such, content-based strategies require gathering external information that might not be available or easy to collect. In contrast, collaborative filtering (CF) relies on past user behavior, e.g., their previous transactions or product or service ratings, and does not require the creation of explicit profiles. Notably, collaborative techniques require no domain knowledge and avoid the need for extensive data collection. In addition, relying directly on user behavior facilitates uncovering complex and unexpected patterns that would be difficult or impossible to profile using content-based recommendation techniques.

In order to establish recommendations, conventional collaborative filtering recommender systems compare fundamentally different objects: items against users. There are two primary approaches to facilitate this comparison: neighborhood modeling and latent factor modeling. Conventional neighborhood models center on determining the relationships between items or, alternatively, between users. An item-oriented neighborhood model approach evaluates the preference of a user to an item based on ratings of similar items by the same user. In a sense, this approach transforms users to the item space by viewing them as baskets of rated items. This way, it is not necessary to directly compare users to items, but rather items can be directly related to other items.

Latent factor models, such as those based on Singular Value Decomposition (SVD), comprise an alternative approach by transforming both items and users to the same latent factor space, thus making them directly comparable. The latent factor space attempts to explain ratings by characterizing both items and users on factors automatically inferred from user feedback. For example, when the items are movies, factors might measure obvious dimensions such as comedy vs. drama, amount of action, or orientation to children; as well as less well-defined dimensions such as depth of character development or quirkiness, or completely uninterpretable dimensions. Neighborhood models are most effective at detecting very localized relationships. They rely on a few significant neighborhood relations, often ignoring the vast majority of ratings by a user.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which:

FIG. 2 is a flow diagram illustrating an example collaborative filtering process of the multimedia content distribution system of FIG. 1 in accordance with at least one embodiment of the present disclosure;

FIG. 3 is a flow diagram illustrating an example collaborative filtering process based on an user-independent neighborhood model in accordance with at least one embodiment of the present disclosure;

FIG. 4 is a flow diagram illustrating an example collaborative filtering process based on an example SVD-based latent factor model in accordance with at least one embodiment of the present disclosure;

The use of the same reference symbols in different drawings indicates similar or identical items.

DETAILED DESCRIPTION OF THE DRAWINGS

The numerous innovative teachings of the present application will be described with particular reference to the presently preferred example embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
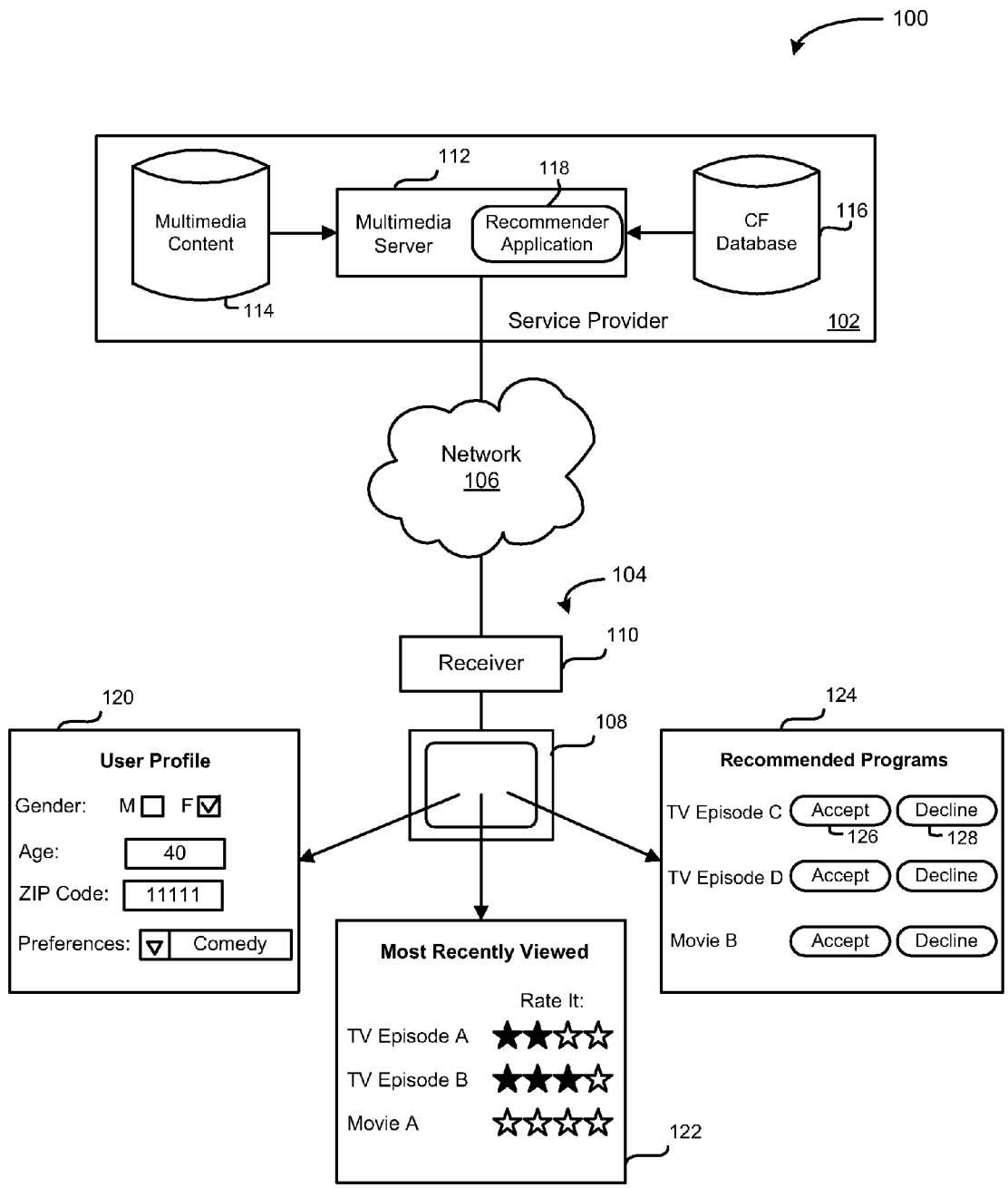
FIG. 1 is a diagram illustrating an example multimedia content distribution system utilizing collaborative filtering in accordance with at least one embodiment of the present disclosure.
Figure 5:
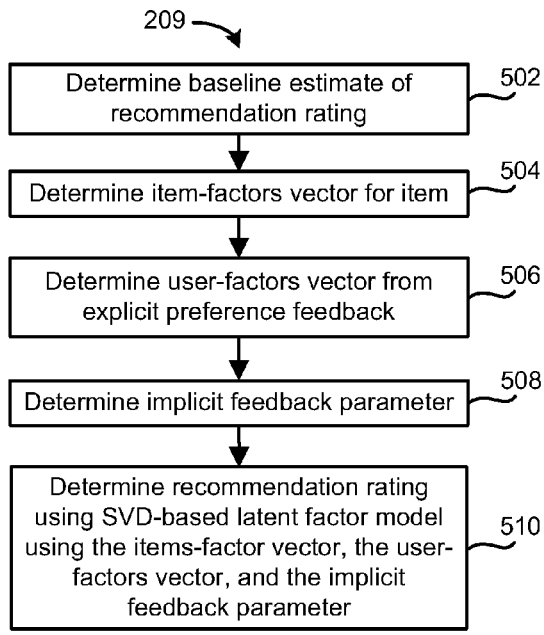
FIG. 5 is a flow diagram illustrating an example collaborative filtering process based on another example SVD-based latent factor model in accordance with at least one embodiment of the present disclosure.
Figure 6:
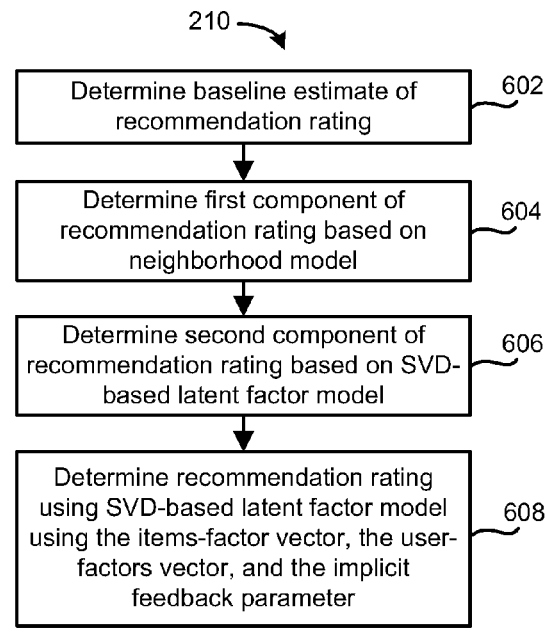
FIG. 6 is a flow diagram illustrating an example collaborative filtering process based on a model integrating the user-independent neighborhood model and an SVD-based latent factor model in accordance with at least one embodiment of the present disclosure.
Figure 7:
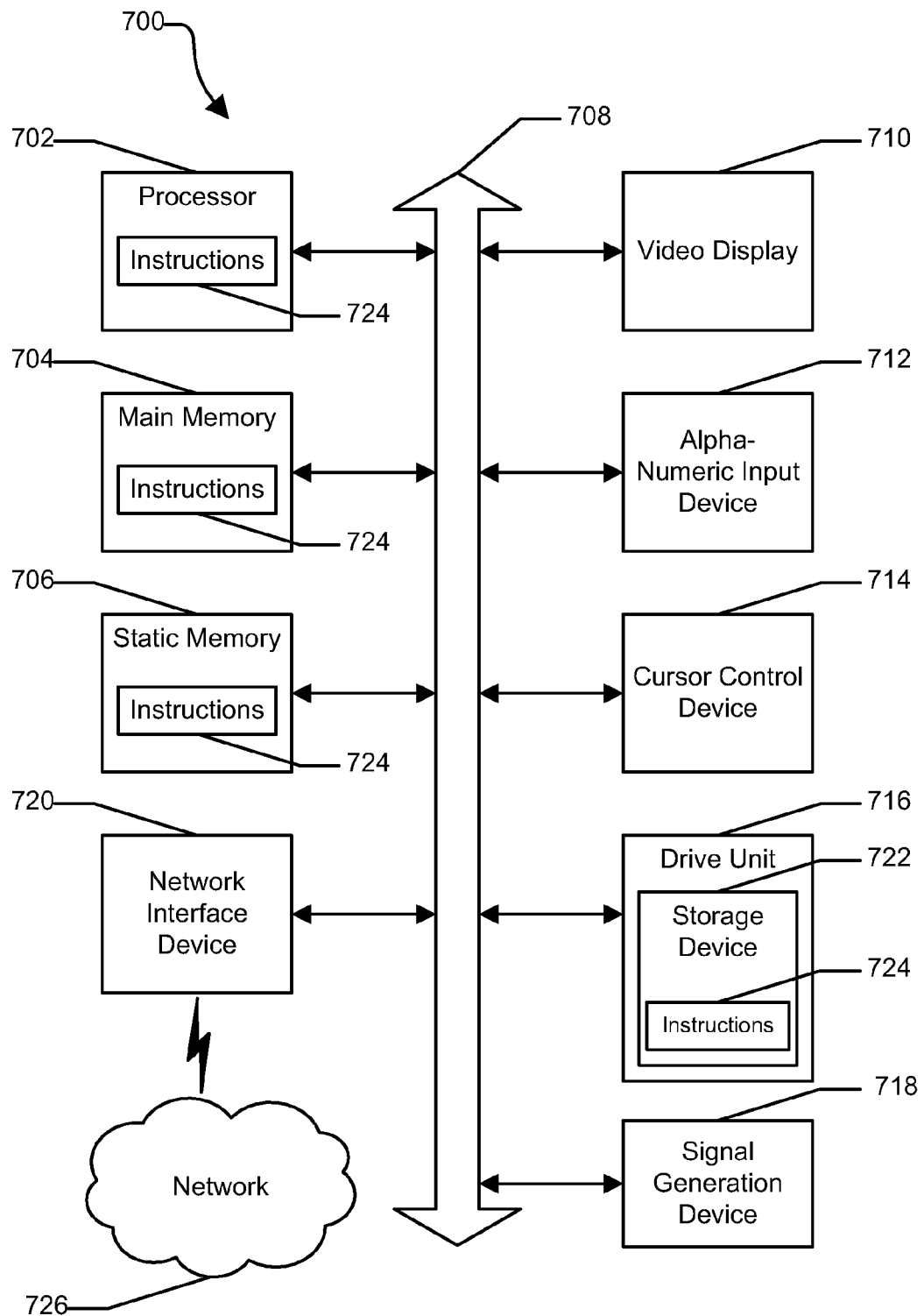
FIG. 7 is a diagram illustrating an example computer system for implementing one or more of the techniques described herein in accordance with at least one embodiment of the present disclosure.

FIGS. 1-7 illustrate example collaborative filtering techniques that provide improved recommendation prediction accuracy by capitalizing on the advantages of both neighborhood and latent factor approaches. FIGS. 1 and 2 illustrate an example multimedia content distribution system in which the collaborative filtering techniques can be advantageously deployed. FIG. 3 illustrates embodiments of a collaborative filtering based on an optimization framework that allows smooth integration of a neighborhood model with latent factor models, and which provides for the inclusion of implicit user feedback. FIGS. 4 and 5 illustrate embodiments of SVD-based latent factor models that facilitate the explanation or disclosure of the reasoning behind recommendations. FIG. 6 illustrates an embodiment of a collaborative filtering model that integrates the neighborhood modeling described in FIG. 3 and the SVD-based latent factor modeling described with respect to FIGS. 4 and 5 into a single modeling framework. FIG. 7 illustrates an example computer system for implementing the collaborative filtering techniques as a software-based application.

For ease of illustration, the collaborative filtering techniques of the present disclosure are generally described in the example context of a multimedia content distribution system whereby a service provider delivers multimedia content in the form of multimedia programs (e.g., television episodes, movies, music, etc.) to a user's multimedia receiver via a network, and whereby the service provider utilizes the collaborative filtering techniques disclosed herein to recommend identified multimedia programs to the user. However, the disclosed collaborative filtering techniques are by no means limited to this example context, and instead can be used in recommender systems for any of a variety of items in any of a variety of contexts, such as for generating recommendations for any of a variety of products or services, including books, movies, movie rentals, music, news articles, recipes, and the like. To illustrate, these collaborative filtering techniques can be implemented in conjunction with a bookseller's website for recommending books to a user or in conjunction with a movie-renter's website for recommending movie rentals to a user.

The mathematical equations, mathematical definitions, mathematical expressions and other mathematical relationships described herein are identified as "EQ. #" (whereby "#" is the associated identifying number) for ease of identification.

FIG. 1 illustrates an example multimedia content distribution system 100 utilizing a collaborative filtering-based recommender system for recommending multimedia programs to a user in accordance with at least one embodiment of the present disclosure. In the depicted example, the multimedia content distribution system 100 includes a service provider 102, one or more user premises 104, and a network 106, whereby the network 106 connects the service provider 102 and the user premises 104. The service provider 102 can include, for example, a cable television provider, a satellite television provider, an Internet-based multimedia content provider, and the like. The user premises include a display device 108 and a multimedia receiver 110. The multimedia receiver 110 can include, for example, a set-top box, a digital network radio receiver, a multimedia-enabled cellular phone, a digital radio receiver, and the like. The display device 108 can include, for example, a television, a monitor, or other display screen.

The network 106 can include any of a variety of digital networks or a combination thereof. Examples of the network 106 can include an Internet-Protocol (IP)-based network, such as the Internet, an Ethernet network, a wireless network (e.g., an IEEE 802.11a/b/g/n-compatible network), a satellite network, a Bluetooth™-based network, and the like. The transmission medium of the network 106 for wire-based implementations can include, for example, a coaxial cable-based medium (e.g., a cable television medium), a digital subscriber line (DSL)-based medium (e.g., a plain old telephone system (POTS) medium), a fiber-optic medium, and the like.

The service provider 102 includes one or more multimedia servers 112, a multimedia content database 114, and a CF database 116. The multimedia content database 114 stores multimedia content representative of multimedia programs available for transmission to the user premises 104. These multimedia programs constitute an example of the "items" of the collaborative filtering techniques described herein. The CF database 116 stores data representative of preference information, including data representative of users' profiles, data representative of users' explicit and implicit preference feedback, data representative of the relationships between items or representative of the similarities of items, data representative of the characteristics of items, and the like.

The multimedia server 112 is configured to distribute multimedia content to the multimedia receiver 110 of the user premises via the network 106. The particular multimedia content provided to the user premises 104 can be distributed based on a particular schedule (e.g., in accordance with television network programming), in response to a request from the user (e.g., as video-on-demand), and the like. The multimedia server 112 further is configured to facilitate the implementation of one or more graphical user interfaces at the multimedia receiver 110, such as an electronic programming guide (EPG). Additionally, in at least one embodiment, the multimedia server 112 implements a recommender application 118 (e.g., software executed by one or more processors) to identify recommended multimedia content for the user using the collaborative filtering techniques described herein.

The multimedia receiver 110 is configured to communicate with the multimedia server 112 via the network 106 to request multimedia content, to receive multimedia content, and the like. The multimedia receiver 110 processes received multimedia content for display via the display device 108. Further, the multimedia receiver 110 is configured to implement an interactive graphical user interface (GUI), displayed via the display device 108, so as to convey certain information to the user and to receive input from the user. This GUI can be implemented as part of, or in association with, an electronic programming guide (EPG). The GUI can be used to display schedules of multimedia programs, display configuration screens to allow the user to configure the multimedia device, and the like. Further, the EPG can be used to receive user feedback with respect to the user's preferences, as well as to convey recommendations for multimedia programs determined by the recommender application 118 of the multimedia server 112.

The preference feedback obtained via the GUI can include explicit preference information, implicit preference information, or a combination thereof. To illustrate, the GUI can include a user profile screen 120 whereby the user can provide explicit feedback that potentially pertain to the user's general profile, such as the user's gender, the user's age, the user's geographical location (e.g., zip code, city, state, country, etc.), and the user's viewing preferences, such as preferred content categories (e.g., comedy, drama, action, family, etc.). The GUI also can obtain explicit item-specific preferences from the user, such as via a rating screen 122 that lists recently viewed multimedia programs and provides the user an opportunity to provide explicit preference feedback with respect to each listed multimedia program (e.g., through a user-selectable "star" rating, a "thumbs-up, thumbs-down" rating, etc.). The GUI also can obtain implicit preference information by monitoring the user's activities. This implicit preference feedback can include, for example, the types of multimedia programs selected by the user for viewing, the frequency in which the user views a particular type of multimedia program, the average length of time that the user views a multimedia program before switching to another multimedia program, and the like. Other sources of explicit or implicit user feedback, such as implicit feedback from monitoring the movements of a mouse cursor or other pointer of the GUI, can be used without departing from the scope of the present disclosure.

The multimedia server 112 incorporates this preference feedback into the CF database 116 and the recommender application 118 uses the information in the CF database 116 to identify one or more multimedia programs to recommend to the user based on collaborative techniques described herein. The multimedia server 112 then indicates the recommended multimedia programs to the user via, for example, the GUI. To illustrate, the GUI can include a recommendation screen 124 that includes a graphical list, matrix of icons, or other graphical representation of the recommended multimedia programs. The recommendation screen 124 further can include a mechanism to permit the user to accept or decline the recommended multimedia programs, e.g., via user-selectable "accept" button 126 and user-selectable "decline" button 128 associated with each recommended multimedia program. The user's choice to accept or decline any given recommendation also can be recorded in the CF database 116 as implicit preference feedback for the user.

Although the example of FIG. 1 depicts the recommender application and CF database 116 as being employed at the service provider 102, in an alternate embodiment, the recommender application 118 and part or all of the CF database 116 instead can be employed locally at the multimedia receiver 110 so as to determine recommendations for the user using the techniques described herein. In such instances, a synchronization mechanism would be employed by the service provider 102 to distribute user preference feedback and item preference feedback information from some or all of the users serviced by the service provider 102 to each multimedia receiver 110 in the multimedia distribution system 100.

FIG. 2 illustrates an example method 200 employed by a recommender system for determining recommended items using collaborative filtering techniques in accordance with at least one embodiment of the present disclosure. For ease of illustration, the method 200 is described in the example context of the multimedia content distribution system 100 of FIG. 1, whereby the method 200 is employed by the recommender application 118 to identify multimedia programs (as the "items") for recommendation to a user. However, the process represented by method 200 can be used in any of a variety of recommender systems without departing from the scope of the present disclosure.

At block 202, the recommender application 118 determines the user's profile based on explicit feedback provided by the user, such as the age, gender, geographical location, and genre preferences obtained from a user via the user profile screen 120 of the GUI provided by the multimedia receiver 110. At block 204, the recommender application 118 obtains explicit user preference feedback from the set of users serviced by the service provider 102 (e.g., through the user's explicit rating of multimedia programs, etc.) and obtains implicit user preference feedback from the set of users (e.g., through the viewing histories of the users, etc.).

At block 206, the recommender application 118 determines recommendation ratings for a set of multimedia programs for a selected user through one or more collaborative filtering techniques disclosed herein. The collaborative filtering techniques can include, for example, a process 207 utilizing a neighborhood model with user-independent weighting (referred to herein as the "user-independent neighborhood" model), a process 208 utilizing a latent factor model (referred to herein as the "asymmetric SVD" model), a process 209 utilizing another latent factor model (referred to herein as the "SVD++" model), or a process 210 that uses an integration of the neighborhood model of process 207 and the SVD++ model of process 209 or the asymmetric SVD model (the resulting model referred to herein as the "integrated model"). The models utilized by the collaborative filtering process 206 are described in greater detail below with reference to FIGS. 3-6.

At block 208, the recommender application 118 provides recommendations to the selected user based on the recommendation ratings of the set of multimedia programs that were determined for the selected user. In at least one embodiment, the recommender application 118 uses a threshold weight to determine whether to recommend a particular multimedia program. To illustrate, if the recommendation ratings for the set of multimedia programs have a possible range of 0.0 (least recommended) to 1.0 (most recommended), then a threshold weight of, for example, 0.7 could be used to determine whether to recommend a corresponding multimedia program. In another embodiment, the recommender application 118 is configured to recommend the top N multimedia programs by recommendation rating. To illustrate, the recommender application 118 could select the ten (N=10) multimedia programs with the highest recommendation ratings of the set of multimedia programs considered for recommendation.

As discussed above with reference to the recommended programs screen 124 of FIG. 1, the provision of the recommendations can include, for example, a display of a list, matrix, or other graphical representation of the recommended multimedia programs via a GUI (e.g., an EPG) provided by the multimedia receiver 110 used by the selected user. The GUI further can include a selection mechanism whereby the selected user can accept or decline the recommended multimedia programs. If a user indicates acceptance of a recommended multimedia application, the recommender application 118 can direct the multimedia server 112 to transmit the data representative of the multimedia program via the network 106 to the multimedia receiver 110 for immediate playback or for storage for playback at a later time.

FIGS. 3-6 illustrate exemplary collaborative filtering processes utilizing novel models in accordance with at least one embodiment of the present disclosure.

In October 2006, Netflix, Inc. initiated a context, the Netflix Prize, with the goal to improve upon the current movie recommender system, Cinematch, implemented by Netflix. To this end, Netflix released a test dataset of over 1.4 million recent movie ratings (the "test set") and a validation dataset of over 1.4 million ratings (the "probe set"), which is used to validate the performance of a recommender system on the test set. These two datasets are collectively referred to herein as "the Netflix data". Netflix's Cinematch algorithm achieved a RMSE prediction error of 0.9514 on the test set, and Netflix has declared the grand prize winner will be the first contestant to develop a process that provides a 10% improvement, or an RMSE of 0.8563, over their Cinematch algorithm on the test set. The two sets of the Netflix data contain many more ratings by users that do not rate much and are harder to predict. Thus, they accurately represent the typical datasets available to a recommender system, which is implemented to predict new ratings from older ones, and to equally address all users, not only the users who rate most frequently. Accordingly, for purposes of illustration, example prediction performances of the collaborative filtering techniques of the present disclosure using the Netflix data are described herein.

For ease of reference, Table 1 illustrates the various symbols used in the equations and expressions described herein and their corresponding meanings or representations.

TABLE 1

Symbol Notation

| Symbol: | Representation: |
|---|---|
| u, v | user |
| i, j | item |
| $r_{ui}$ | rating indicating the preference of user u for item i |
| $\hat{r}_{ui}$ | predicted rating for the preference of user u for item i |
| $e_{ui}$ | prediction error for preference of user u for item i |
| κ | set of (u, i) pairs for which the rating $r_{ui}$ is known (κ = {(u, i)\|$r_{ui}$ known}) |
| R(u) | the set of items rated by user u |
| N(u) | the set of all items for which user u provided some implicit preference |
| $\lambda_1, \lambda_2, \ldots$ | regularization constants (determined via, e.g., cross-validation) |
| $\gamma_1, \gamma_2, \ldots$ | learning rate (step size) |
| μ | average rating for all items of a set of items |
| $b_u$ | observed deviation of the user u from the average |
| $b_i$ | observed deviation of the item i from the average |
| $b_{ui}$ | baseline estimate for an unknown rating $r_{ui}$ |
| $s_{ij}$ | measure of similarity between items i and j |
| $\rho_{ij}$ | Pearson correlation coefficient (measuring tendency of users to rate items i and j similarly) |
| $n_{ij}$ | the number of users who have rated both item i and item j |
| $S^k(i)$ | the k items that are most similar to item i |
| $S^k(i; u)$ | the k items, rated by user u, that are most similar to item i |
| $R^k(i; u)$ | the set of items that are among the k most similar to item i and have been rated by user u, i.e., $R^k(i; u) = R(u) \cap S^k(i)$ |
| $N^k(i; u)$ | the set of items that are among the k most similar to item i and have some implicit preference indicated by user u, i.e., $N^k(i; u) = N(u) \cap S^k(i)$ |
| $\Box^f$ | the set of real vectors having f components |
| $p_u$ | the user-factors vector for the user u determined from a user-items rating matrix via Singular Value Decomposition (SVD) ($p_u \in \Box^f$) |
| $q_i$ | the item-factors vector for the item i determined from a user-items rating matrix via SVD ($q_i \in \Box^f$) |
| $x_i, y_i$ | factor vectors for item i determined from a user-items rating matrix via SVD |
| $\theta_{ij}^u$ | user-specific interpolation weight for items i and j for user u |
| $\omega_{ij}$ | user-independent interpolation weight for items i an j |
| $c_{ij}$ | implicit-preference interpolation weight for items i and j |

As noted by Table 1, special indexing letters are reserved for distinguishing users from items: the index letters u and v for users; and the index letters for items i and j. A rating $r_{ui}$ indicates the preference of user u for item i, where higher values represent stronger preferences and vice versa. For example, ratings can be integers ranging from 1 (star) indicating no interest to 5 (stars) indicating a strong interest. Predicted ratings are distinguished from known ones using the notation $\hat{r}_{ui}$ for the predicted value of $r_{ui}$. The (u, i) pairs for which $r_{ui}$ is known are stored in the set K={(u, i)\|$r_{ui}$ known}. Usually the vast majority of ratings are unknown. For example, in the Netflix data, 99% of the possible ratings are absent. In order to combat overfitting such sparse rating data, the models disclosed herein can be regularized so that estimates are shrunk towards baseline defaults. Regularization is controlled by regularization constants which are denoted as $\lambda_1, \lambda_2, \ldots$ Exact values of these regularization constants can be determined by cross validation such that, as they increase in value regularization becomes heavier.

Typical CF datasets exhibit large user and item effects, i.e., systematic tendencies for some users to give higher ratings than others, and for some items to receive higher ratings than others. It is customary to adjust the data by accounting for these effects, which are encapsulated within baseline estimates. EQ. 1 below represents a model for determining a baseline estimate, denoted as $b_{ui}$, for an unknown rating $r_{ui}$ for a selected user u and a selected item i, whereby the model accounts for the user and item effects:

$$b_{ui} = \mu + b_u + b_i \quad \text{EQ. 1}$$

whereby μ represents the overall average rating for the item i and the parameters $b_u$ and $b_i$ indicate the observed deviations of user u and item i, respectively, from the average. For example, suppose that a baseline estimate is desired for the rating of Movie A by User B. Assuming that the average rating over all movies, μ, is 3.7 stars and Movie A is better than an average movie, so it tends to be rated 0.5 stars above the average. On the other hand, User B is a critical user, who tends to rate movies 0.3 stars lower than the average. Thus, the baseline estimate for User B's rating of Movie A using EQ. 1 would be 3.9 stars (3.7−0.3+0.5).

The least squares problem of EQ. 2 below can be used to estimate $b_u$ and $b_i$:

$$\min_{b^*} \sum_{(u,i) \in \kappa} (r_{ui} - \mu - b_u - b_i)^2 + \lambda_1 * \left( \sum_u b_u^2 + \sum_i b_i^2 \right) \quad \text{EQ. 2}$$

In EQ. 2, the first term $$\sum_{(u,i) \in \kappa} (r_{ui} - \mu - b_u - b_i)^2$$

strives to find values for $b_u$ and $b_i$ that fit the given ratings. The regularizing term $$\lambda_1 * \left( \sum_u b_u^2 + \sum_i b_i^2 \right)$$

has the effect of reducing or avoiding overfitting by penalizing the magnitudes of the parameters.

As discussed above, the most common approach to collaborative filtering is through the use of neighborhood models. Early neighborhood models were user-oriented and estimated unknown ratings based on recorded ratings of like-minded users. Subsequently, an item-oriented neighborhood approaches were instituted. In these models, a rating is estimated using known ratings made by the same user on similar items. Better scalability and improved accuracy make the item-oriented approach more favorable in many cases. In addition, item-oriented neighborhood methods are more amenable to explaining the reasoning behind predictions. This is because users are familiar with items previously preferred by them, but do not know those allegedly like-minded users. Thus, the neighborhood models described below are described in the context of item-oriented approaches. However, these techniques can be adapted for a user-oriented approach by switching the roles of users and items without departing from the scope of the present disclosure.

Central to most item-oriented neighborhood models is a similarity measure between items. Frequently, it is based on the Pearson correlation coefficient, $\rho_{ij}$, which measures the tendency of users to rate items i and j similarly. Because many ratings typically are unknown, it is expected that some items share only relatively few common raters. Computation of the correlation coefficient therefore is based only on the common user support. Accordingly, similarities based on a greater user support are more reliable. An appropriate similarity measure, denoted by $s_{ij}$, includes a shrunk correlation coefficient:

$$s_{ij} = \frac{n_{ij}}{n_{ij} + \lambda_2} \rho_{ij} \qquad \text{EQ. 3}$$

The variable $n_{ij}$ denotes the number of users that rated both items i and j. A typical value for $\lambda_2$ is 100, but it depends on the dataset and is determined by cross-validation. Although EQ. 3 illustrates an example similarity measure, alternate similarity measures can be implemented in place of the illustrated similarity measure.

The goal of a recommender system is to predict $r_{ui}$, i.e., the unobserved rating by a selected user u for a selected item i, and selectively recommend the item according to the predicted rating. To this end, the k items rated by user u which are most similar to item i are identified by the recommender system using the similarity measure $s_{ij}$. This set of k neighbors is denoted by $S^k(i; u)$. As illustrated by EQ. 4, the predicted value of $r_{ui}$ can taken as a weighted average of the ratings of neighboring items while adjusting for user and item effects through the baseline estimates:

$$\hat{r}_{ui} = b_{ui} + \frac{\sum_{j \in S^k(i;u)} s_{ij}(r_{uj} - b_{uj})}{\sum_{j \in S^k(i;u)} s_{ij}} \qquad \text{EQ. 4}$$

Conventional neighborhood models of this form are frequently used because they are intuitive and relatively simple to implement. However, such neighborhood schemes are subject to certain limitations. Most notably, these conventional techniques are not justified by a formal model. Further, the suitability of a similarity measure that isolates the relations between two items without analyzing the interactions within the full set of neighbors can be suspect. In addition, the fact that interpolation weights in EQ. 4 sum to one (1) forces this method to fully rely on the neighbors, even in cases where neighborhood information is absent (i.e., user u did not rate items similar to i), and it would be preferable to rely on baseline estimates.

Accordingly, a more accurate conventional neighborhood model was developed in view of the above-identified limitations in conventional neighborhood models difficulties. In this model, the recommender system determines interpolation weights $\{\theta_{ij}^u | j \in S^k(i; u)\}$ for set of neighbors $S^k(i; u)$ that enable the best prediction rule of EQ. 5:

$$\hat{r}_{ui} = b_{ui} + \sum_{j \in S^k(i;u)} \theta_{ij}^u (r_{uj} - b_{uj}) \qquad \text{EQ. 5}$$

Derivation of the interpolation weights $\theta_{ij}^u$ can be achieved by estimating all inner products between item ratings.

As discussed above, latent factor models comprise an alternative approach to collaborative filtering with the more holistic goal to uncover latent features that explain observed ratings; examples include Probalistic Latent Semantic Analysis (pLSA), neural networks, and Latent Dirichlet Allocation. More recently, models that employ Singular Value Decomposition (SVD) on the user-item ratings matrix gained popularity due to their accuracy and scalability. A typical conventional SVD-based model associates each user u with a user-factors vector $p_u \in \Box^f$, and each item i with an item-factors vector $q_i \in \Box^f$. A prediction for the preference of a selected user u for a selected item i can be calculated by taking an inner product as represented by EQ. 6:

$$\hat{r}_{ui} = b_{ui} + p_u^T q_i \qquad \text{EQ. 6}$$

However, the more calculation-intensive part is parameter estimation. In information retrieval, SVD often is used to identify latent semantic factors. However, applying SVD in the CF domain raises difficulties due to the high portion of missing ratings. Conventional SVD is undefined when knowledge about the matrix is incomplete. Moreover, addressing only the relatively few known entries without the appropriate caution is highly prone to overfitting. Some conventional processes rely on imputation to fill in missing ratings and make the rating matrix dense. However, this imputation can be very calculation-intense as it significantly increases the amount of data. In addition, the data may be considerably distorted due to inaccurate imputation. Accordingly, other conventional processes have been developed that model directly only the observed ratings, while avoiding overfitting through an adequate regularized model, such as EQ. 7:

$$\min_{p_*, q_*, b_*} \sum_{(u,i) \in K} (r_{ui} - \mu - b_u - b_i - p_u^T q_i) + \qquad \text{EQ. 7}$$
$$\lambda_3 (\|p_u\|^2 + \|q_i\|^2 + b_u^2 + b_i^2)$$

A simple gradient descent technique can be applied to solve EQ. 7.

A variant of the SVD-based model, commonly referred to as the NSVD model, avoids explicitly parameterizing each user, and instead models users based on the items that the users rated. This way, each item i is associated with two factor vectors $q_i$ and $x_i$. In accordance with this conventional model, the representation of a user u is through the sum:

$$\frac{\sum_{j \in R(u)} x_j}{\sqrt{|R(u)|}} \qquad \text{EQ. 8}$$

such that for the set R(u) of items rated by user u, the predicted rating is calculated as:

$$\hat{r}_{ui} = b_{ui} + q_i^T \left( \frac{\sum_{j \in R(u)} x_j}{\sqrt{|R(u)|}} \right) \qquad \text{EQ. 9}$$

As noted above, the novel collaborative filtering models described herein integrate both explicit and implicit user feedback. For a dataset such as the Netflix data, the most natural choice for implicit feedback would be movie rental history, which informs of user preferences without requiring users to explicitly provide their ratings. However, such data often is not available. Nonetheless, a more nuanced source of implicit data does exist within datasets such as the Netflix dataset. This dataset not only informs of the rating values, but also which movies users rate, regardless of how they rated these movies. In other words, a user implicitly informs of his or her preferences by choosing to voice an opinion by voting a high or low rating. This reduces the ratings matrix into a binary matrix, whereby a "1" can stand for "rated" and a "0" can stand for "not rated". While, this binary data is not as vast and independent as other sources of implicit feedback, the inventors have found that incorporating this kind of implicit data—which inherently exists in every rating based recommender system—can significantly improve prediction accuracy.

The novel models disclosed herein are not limited to a certain kind of implicit data. Rather, in general each user u is associated with two sets of items, one is denoted by R(u), and contains all the items for which ratings by the user u are available. The other set of items, denoted by N(u), contains all items for which the user u provided some implicit preference.

Disclosed in the following and with reference to FIG. 3 is a user-independent neighborhood model for collaborative filtering that allows an efficient global optimization scheme. This user-independent neighborhood model offers increased accuracy and is able to integrate implicit user feedback. As described below, this model can implement various levels of complexity that further increase its accuracy. As noted above, conventional neighborhood models were centered around user-specific interpolation weights, such as the user-specific interpolation weights $s_{ij}$ and $\theta_{ij}^u$ of EQs. 4 and 5, respectively, which relate item i to the items in a user-specific neighborhood $S^k(i; u)$. In order to facilitate global optimization, the user-independent neighborhood model avoids such user-specific interpolation weights in favor of global interpolation weights that are independent of a specific user. Such user-independent weight from item j to item i is denoted by $\omega_{ij}$ and can be determined from the CF dataset through optimization. A base level of the user-independent neighborhood model describes a rating $r_{ui}$ as:

$$\hat{r}_{ui} = b_{ui} + \sum_{j \in R(u)} (r_{uj} - b_{uj}) \omega_{ij} \qquad \text{EQ. 10}$$

It will be appreciated that the user-independent neighborhood model of EQ. 10 differs from the neighborhood model of EQ. 5 in that the user-independent neighborhood model implements the user-independent weight $\omega_{ij}$ instead of the user-specific interpolation weight $\theta_{ij}^u$, and further that the user-independent neighborhood model sums over all items rated by the selected user u (i.e., over the set R(u)), whereas the conventional neighborhood model merely sums over those k items most related to the selected item i that have been rated by the user (i.e., over the set $S^k(u;i)$). As discussed in greater detail below, this novel approach provides for better prediction accuracy by learning all parameters through a rigorous global optimization process and by integrating both explicit and implicit feedback in order to gain higher precision.

Turning to the interpretation of the user-independent weights $\omega_{ij}$, it will be appreciated that the user-specific interpolation weights represent interpolation coefficients relating unknown ratings to existing ones. The user-independent neighborhood model adopts a different viewpoint whereby the user-independent weights represent offsets to baseline estimates. As such, the residuals, $r_{uj} - b_{uj}$, represent the coefficients multiplying those offsets. Thus, for two related items i and j, the corresponding user-independent weight $107_{ij}$, is expected to be high. Thus, whenever a user u has rated an item j higher than expected (i.e., $r_{uj} - b_{uj}$ is high), it is advantageous to increase the estimate for the user's rating of the selected item i by adding the component $(r_{uj} - b_{uj}) \omega_{ij}$ to the baseline estimate. Likewise, the estimate will not deviate significantly from the baseline by an item j that the selected user u rated just as expected (i.e., $r_{uj} - b_{uj}$ is approximately zero), or by an item j that is not known to be predictive for item i (i.e., $\omega_{ij}$ is approximately zero). This viewpoint suggests several enhancements. First, the user-independent neighborhood model can be refined to incorporate implicit feedback, which provides an alternative way to learn user preferences. To this end, another set of implicit feedback weights $c_{ij}$ can be implemented in the model of EQ. 10, resulting in a refined neighborhood model represented as:

$$\hat{r}_{ui} = b_{ui} + \sum_{j \in R(u)} (r_{uj} - b_{uj}) \omega_{ij} + \sum_{j \in N(u)} c_{ij} \qquad \text{EQ. 11}$$

Much like the user-independent weights $\omega_{ij}$, the implicit feedback weights $c_{ij}$ are offsets added to baseline estimates. For two items i and j, an implicit preference by the selected user u for the item j leads to the modification of the estimate of $r_{ui}$ by the weight $c_{ij}$, which is expected to be high if item j is predictive on item i. Further, in at least one embodiment, the implicit feedback weights $c_{ij}$ can be scaled by significance weights for the represented implicit feedback.

Interpreting the weights $\omega_{ij}$, and $c_{ij}$ as global offsets, rather than as user-specific interpolation coefficients, emphasizes the influence of missing ratings. In other words, a user's opinion is formed not only by what he or she rated, but also by what he or she did not rate. For example, suppose that a movie ratings dataset shows that users that rate "Lord of the Rings 3" high also gave high ratings to "Lord of the Rings 1-2". This will establish high weights from "Lord of the Rings 1-2" to "Lord of the Rings 3". Now, if a user did not rate "Lord of the Rings 1-2" at all, the user's predicted rating for "Lord of the Rings 3" will be penalized, as some necessary weights cannot be added to the sum.

Unlike some conventional neighborhood models, it is unnecessary to maintain compatibility between the $b_{ui}$ values and the $b_{uj}$ values because the user-independent neighborhood model does not use interpolation and thus can decouple the definitions of $b_{ui}$ and $b_{uj}$. Accordingly, the user-independent neighborhood model can be implemented as a more general prediction rule represented as:

$$\hat{r}_{ui} = \tilde{b}_{ui} + \sum_{j \in R(u)} (r_{uj} - b_{uj})\omega_{ij} + \sum_{j \in N(u)} c_{ij} \qquad \text{EQ. 12}$$

whereby $\tilde{b}_{ui}$ represents predictions of $r_{ui}$ using other collaborative filtering techniques, such as a conventional rating rule or a latent factor model as described below. As an example, the following prediction rule for implementing the user-independent neighborhood model has found to be effective:

$$\hat{r}_{ui} = \mu + b_u + b_i + \sum_{j \in R(u)} (r_{uj} - b_{uj})\omega_{ij} + \sum_{j \in N(u)} c_{ij} \qquad \text{EQ. 13}$$

It should be noted that the baseline estimates $b_{uj}$ remain constant and are derived as explained above. In contrast, the deviations $b_u$ and $b_i$ become parameters, which are optimized much like the weights $\omega_{ij}$ and $c_{ij}$.

A characteristic of the current scheme is that it encourages greater deviations from baseline estimates for users that provided many ratings (high $|R(u)|$) or plenty of implicit feedback (high $|N(u)|$). This generally is an effective practice for recommender systems since more recommendation risk typically is acceptable for well-modeled users that provided much input. Thus, for such users a recommender system is more likely to permit predictions of quirkier and less common recommendations. On the other hand, less risk is permitted in modeling users that provided only a little input, in which case the recommender system typically prefers to stay with safe estimates close to the baseline values. However, the user-independent neighborhood model of EQs. 11-13 has the potential to somewhat overemphasizes the dichotomy between heavy raters and those that rarely rate. Accordingly, the inventors have determined that improved results can be obtained when this behavior is modified by modifying the prediction rule of EQ. 13 to generate the prediction rule represented as:

$$\hat{r}_{ui} = \qquad \text{EQ. 14}$$
$$\mu + b_u + b_i + |R(u)|^{-n} \sum_{j \in R(u)} (r_{uj} - b_{uj})\omega_{ij} + |N(u)|^{-n} \sum_{j \in N(u)} c_{ij},$$
$$0 < n < 1$$

It will be appreciated that no scaling at all (n=0) will lead to huge deviations from baseline for users that gave substantial feedback (i.e., the sums in the equations would involve many terms). Conversely, fully scaling by $|R(u)|^{-1}$ and $|N(u)|^{-1}$ (n=1) would treat all users equally and does not permit the recommender system to take more risk with users that provided substantial. The inventors have found that a value of n=½ provided a compromise that gave the best results.

Complexity of the model of EQ. 14 can be reduced by pruning parameters corresponding to unlikely item-item relations. Let $S^k(i)$ represent the set of k items most similar to item i, as determined by the similarity measure $s_{ij}$ discussed above and let $R^k(i;u)$ be defined as the set of k items that are most similar to item i that have been rated by user u, i.e., $R^k(i;u) = R(u) \cap S^k(i)$. Additionally, let $N^k(i;u)$ be defined as the set of k items that are most similar to item i that have some implicit preference indicated by user u, i.e., $N^k(i;u) = N(u) \cap S^k(i)$. Now, when predicting $r_{ui}$ according to the model of EQ. 14, it is expected that the most influential weights will be associated with items similar to item i. Hence, the model of EQ. 14 can be modified to generate a refined neighborhood model represented as:

$$\hat{r}_{ui} = \mu + b_u + b_i + \qquad \text{EQ. 15}$$
$$|R^k(i;u)|^{-n} \sum_{j \in R^k(i;u)} (r_{uj} - b_{uj})\omega_{ij} + |N^k(i;u)|^{-n} \sum_{j \in N^k(i;u)} c_{ij},$$
$$0 < n < 1$$

It will be appreciated that when k is infinity ($\infty$), the model of EQ. 15 reduces to the model of EQ. 14. However, for other values of k the model of EQ. 15 offers the potential to significantly reduce the number of variables involved, thereby facilitating rapid training of the model.

Relatively substantial computational effort is needed at a pre-processing state for estimating the parameters of the user-independent neighborhood models described above. In one embodiment, these model parameters are determined by solving a regularized least squares problem associated the model of EQ. 15 and represented as:

$$\min_{p_*,\omega_*,c_*} \sum_{(u,i) \in K} \left( \begin{array}{l} r_{ui} - \mu - b_u - b_i - |N^k(i;u)|^{-n} \sum_{j \in N^k(i;u)} \\ c_{ij} - |R^k(i;u)|^{-n} \sum_{j \in R^k(i;u)} (r_{uj} - b_{uj})\omega_{ij} \end{array} \right)^2 + \qquad \text{EQ. 16}$$
$$\lambda_4 \left( b_u^2 + b_i^2 + \sum_{j \in R^k(i;u)} \omega_{ij}^2 + \sum_{j \in N^k(i;u)} c_{ij}^2 \right),$$
$$0 < n < 1$$

An optimal solution of this convex problem can be obtained by least square solvers, which are part of standard linear algebra packages. However, the inventors have found that the following simple gradient descent solver is effective. Denoting the prediction error, $r_{ui} - \hat{r}_{ui}$, by $e_{ui}$, the recommender system loops through all known ratings in K. For a given training case $r_{ui}$, the parameters are modified by moving in the opposite direction of the gradient, yielding:

$$b_u \leftarrow b_u + \gamma \cdot (e_{ui} - \lambda_4 \cdot b_u) \qquad \text{EQ. 17}$$

$$b_i \leftarrow b_i + \gamma \cdot (e_{ui} - \lambda_4 \cdot b_i) \qquad \text{EQ. 18}$$

$$\forall j \in R^k(i;u): \omega_{ij} \leftarrow \omega_{ij} + \gamma \cdot (|R^k(i;u)|^{-n} \cdot e_{ui} \cdot (r_{uj} - b_{uj}) - \lambda_4 \cdot \omega_{ij}) \qquad \text{EQ. 19}$$

$$\forall j \in N^k(i;u): c_{ij} \leftarrow c_{ij} + \gamma \cdot (|N^k(i;u)|^{-n} \cdot e_{ui} - \lambda_4 \cdot c_{ij}) \qquad \text{EQ. 20}$$

The meta-parameters $\gamma$ (step size) and $\lambda_4$ can be determined by cross-validation. The inventors have found that a value for $\gamma$ of 0.005 and for $\lambda_4$ of 0.002 are effective in the example of the Netflix data. A typical number of iterations throughout the training data is fifteen (15). Another parameter to consider is k, which controls the neighborhood size. It will be appreciated that increasing k always benefits the accuracy of the results on the test set. Hence, the choice of k should reflect a tradeoff between prediction accuracy and computational cost.

FIG. 3 summarizes the process 207 (FIG. 2) for implementing the user-independent neighborhood model in a collaborative filtering technique for predicting a recommendation rating $r_{ui}$ for a selected item i and a selected user u. At block 302, the recommender system determines a baseline estimate $b_{ui}$ of the recommendation rating based on the observed deviations of the selected user u and the selected item i from the average as described above with reference to EQs. 1 and 2. At block 304, the recommender system determines the user-independent weights $\omega_{ij}$. At block 306, the recommender system determines the user weighting parameters $b_u$, $b_i$, $N(u)$, $N^k(i;u)$, $R(u)$, and $R^k(i;u)$. At block 308, the recommender system determines the implicit preference weights $c_{ij}$. As described above, the weights and the other parameters can be determined from a CF dataset using the regularized least squares problem of EQ. 16 (associated the model of EQ. 15) and the gradient descent solver of EQs. 17-20. Further, although FIG. 3 is illustrated as a sequence of blocks relating to the corresponding processes, no order is intended in determining these parameters. Rather, it will be appreciated that only the non-parameters (i.e., the fixed sets $N(u)$, $N^k(i;u)$, and $R(u)$) are known before the learning process initiates and all of the weights and other parameters typically are learned simultaneously using the regularized least squares problem and gradient solver. Once these weights and parameters are determined, at block 310 the recommender system can determine the recommender rating for the selected item i and the selected user u using any of the versions of the user-independent neighborhood model represented by EQs. 12-15.

Disclosed in the following and with reference to FIG. 4 is an improved SVD-based latent factor model (process 208, FIG. 2) in accordance with at least one embodiment of the present disclosure. As discussed above, a popular approach to latent factor models is induced by an SVD-like lower rank decomposition of the ratings matrix. Each user u is associated with a user-factors vector $p_u \in \square^f$, and each item i is associated with an item-factors vector $q_i \in \square^f$. The conventional prediction using these vectors is done via the model represented by EQ. 6 above. This conventional model is designated herein as the "SVD" model.

To improve upon the SVD model, the process 208 (FIG. 2) utilizes an SVD-based latent factor model that incorporates implicit preference feedback, this model being identified herein as the "asymmetric SVD" model and being represented as:

$$\hat{r}_{ui} = b_{ui} + q_i^T \left( |R(u)|^{-n} \sum_{j \in R(u)} (r_{uj} - b_{uj}) x_j + |N(u)|^{-n} \sum_{j \in N(u)} y_j \right), \quad \text{EQ. 21}$$

$$0 < n < 1$$

whereby each item i is associated with three factor vectors, $q_i$, $x_i$, $y_i \in \square^f$. As discussed above, the inventors have found a value of ½ for the power variable n provides the best compromise. Instead of providing an explicit parameterization for users, the users are represented through the items that they prefer. Thus, the conventional user-factors vector $p_i$ is replaced in the asymmetric SVD model represented in EQ. 21 by the sum:

$$\left( |R(u)|^{-n} \sum_{j \in R(u)} (r_{uj} - b_{uj}) x_j + |N(u)|^{-n} \sum_{j \in N(u)} y_j \right), \quad \text{EQ. 22}$$

$$0 < n < 1$$

As discussed above, the inventors have found a value of ½ for the power variable n provides the best compromise. The asymmetric SVD model offers several benefits. For one, the asymmetric SVD model requires fewer parameters. Typically the number of users is much larger than the number of items. Thus, exchanging user parameters with item parameters lowers the complexity of the model. Another benefit is the ease of integrating new users. Because the asymmetric SVD model does not parameterize users, it can handle new users as soon as they provide feedback to the recommender system without needing to re-train the model and estimate new parameters. Notice that for new items the asymmetric SVD model does not need to learn new parameters. This asymmetry between users and items meshes well with common practices in that recommender systems need to provide rapid recommendations to new users who expect quality service. Conversely, it is reasonable to require a waiting period before recommending items new to the system. Another benefit is improved explainability as to the rationale behind the recommendation. Users expect a recommender system to give a reason for its predictions, rather than facing "black box" recommendations. This not only enriches the user experience, but also encourages users to interact with the system, fix wrong impressions and improve long-term accuracy. Conventional latent factor models such as the basic SVD model face real difficulties to explain predictions. After all, a key to these models is abstracting users via an intermediate layer of user factors. This intermediate layer separates the computed predictions from past user actions and complicates explanations. In contrast, the asymmetric SVD model does not employ any level of abstraction on the user side. Hence, predictions are a direct function of past users' feedback. Such a framework allows identifying which of the past user actions are most influential on the computed prediction, thereby explaining predictions by most relevant actions. Yet another benefit is efficient integration of implicit feedback. Prediction accuracy is improved by considering also implicit feedback, which provides an additional indication of user preferences. Implicit feedback becomes increasingly important for users that provide much more implicit feedback than explicit one. Accordingly, in the asymmetric SVD model the implicit perspective becomes more dominant as $|N(u)|$ increases and the degree of implicit feedback increases. On the other hand, the explicit perspective becomes more significant when $|R(u)|$ is growing and we have many explicit observations. Typically, a single explicit input would be more valuable than a single implicit input. The right conversion ratio, which represents how many implicit inputs are as significant as a single explicit input, can be directly obtained from the data by setting the relative values of the $x_j$ and $y_j$ parameters.

These values of the parameters of the asymmetric SVD model can be determined by minimizing the regularized squared error function associated with EQ. 22 using the following:

$$\min_{q_*,x_*,y_*,b_*} \sum_{(u,i)\in K} \left( \left( r_{ui} - \mu - b_u - b_i - q_i^T \atop \left(|R(u)|^{-n} \sum_{j\in R(u)}(r_{uj}-b_{uj})x_j + |N(u)|^{-n}\sum_{j\in N(u)} y_j\right) \right) \right)^2 \quad \text{EQ. 23}$$
$$+ \lambda_5\left(b_u^2 + b_i^2 + \|q_i\|^2 + \sum_{j\in R(u)}\|x_j\|^2 + \sum_{j\in N(u)}\|y_j\|^2\right),$$
$$0 < n < 1$$

As with the user-independent neighborhood model described above, a simple gradient descent scheme to solve the system of EQ. 23. For the Netflix data the inventors found thirty (30) iterations, with step size of 0.002 and a parameter $\lambda_5$ of 0.04, was effective in arriving at the solution. An important issue is whether predictive accuracy must be given up in order to enjoy the aforementioned benefits of the asymmetric SVD model. In evaluating this approach using the Netflix data, the inventors found that the prediction quality of the asymmetric SVD model actually is slightly better than the conventional SVD model while maintaining the described advantages over the conventional SVD model. This improvement is due to the accounting for implicit feedback.

FIG. 4 summarizes the process 208 (FIG. 2) for implementing the asymmetric SVD model in a collaborative filtering technique for predicting a recommendation rating $r_{ui}$ for a selected item i and a selected user u. At block 402, the recommender system determines a baseline estimate $b_{ui}$ of the recommendation rating based on the observed deviations of the selected user u and the selected item i from the average as described above with reference to EQs. 1 and 2. At block 404, the recommender system determines the items-factor vector $q_i$ for the selected item i from the user-items ratings matrix. At block 406, the recommender system determines a representation of the user based on items preferred by the user by using the sum determined from EQ. 22 in place of the conventional user-factors vector $p_i$. As described above, the parameters of the asymmetric SVD model can be determined from a CF dataset using a regularized least squares problem and the gradient descent solver. Further, although FIG. 4 is illustrated as a sequence of blocks relating to the corresponding processes, no order is intended in determining these parameters. Rather, it will be appreciated that only the non-parameters (i.e., the fixed sets N(u), $N^k$(i;u), and R(u)) are known before the learning process initiates and all of the weights and other parameters typically are learned simultaneously using the regularized least squares problem and gradient solver. At block 408, the recommender system determines the recommender rating for the selected item i and the selected user u using the parameters determined in blocks 402-406 in the asymmetric SVD model represented in EQ. 21.

Disclosed in the following and with reference to FIG. 5 is another improved SVD-based latent factor model (process 209, FIG. 2) in accordance with at least one embodiment of the present disclosure. More accurate results may be obtained by a direct modification of the base SVD model represented by EQ. 2, leading to the following SVD-based latent factor model, identified herein as the "SVD++" model:

$$\hat{r}_{ui} = b_{ui} + q_i^T\left(p_u + |N(u)|^{-n}\sum_{j\in N(u)} y_j, 0 < n < 1\right) \quad \text{EQ. 24}$$

For the SVD++ model, the selected user u is modeled as $$p_u + |N(u)|^{-n}\sum_{j\in N(u)} y_j$$

using a free user-factors vector $p_u$ determined from the given explicit user ratings. This vector is complemented by the sum $$|N(u)|^{-n}\sum_{j\in N(u)} y_j,$$

which represents the perspective of implicit user preference feedback.

In one embodiment, the parameters of the SVD++ model (EQ. 24) can be determined by minimizing the associated squared error function through gradient descent. The SVD++ model does not offer the previously mentioned benefits of the asymmetric SVD model of having fewer parameters, conveniently handling new users and readily explainable results. This is because the SVD++ model abstracts each user with a user-factors vector. However, the inventors have found that the SVD++ model provides significant improvement in prediction accuracy compared to the asymmetric SVD model.

FIG. 5 summarizes the process 209 (FIG. 2) for implementing the SVD++ model in a collaborative filtering technique for predicting a recommendation rating $r_{ui}$ for a selected item i and a selected user u. At block 502, the recommender system determines a baseline estimate $b_{ui}$ of the recommendation rating based on the observed deviations of the selected user u and the selected item i from the average as described above with reference to EQs. 1 and 2. At block 504, the recommender system determines the items-factor vector $q_i$ for the selected item i from the user-items ratings matrix. At block 506, the recommender system determines user-factors vector $p_u$ determined from the given explicit user ratings. At block 508, the recommender system determines an implicit feedback parameter as the sum $$|N(u)|^{-\frac{1}{2}}\sum_{j\in N(u)} y_j$$

of the SVD++ model of EQ. 24. As described above, the parameters of the SVD++ model can be determined from a CF dataset using a regularized least squares problem and the gradient descent solver. Further, although FIG. 5 is illustrated as a sequence of blocks relating to the corresponding processes, no order is intended in determining these parameters. Rather, it will be appreciated that only the non-parameters (i.e., the fixed sets N(u), $N^k$(i;u), and R(u)) are known before the learning process initiates and all of the weights and other parameters typically are learned simultaneously using the regularized least squares problem and gradient solver. At block 510, the recommender system determines the recommender rating for the selected item i and the selected user u using the parameters determined in blocks 502-508 in the SVD++ model represented in EQ. 24.

Disclosed in the following and with reference to FIG. 6 is a collaborative filtering that combines the user-independent neighborhood model and the SVD++ model (process 210, FIG. 2) in accordance with at least one embodiment of the present disclosure. This integrated model is based on a formal model, whose parameters can be determined by solving a least squares problem. An advantage of this approach is allowing easy integration with other collaborative filtering methods that are based on similarly structured global cost functions. As discussed above, the inventors have discovered that latent factor models and neighborhood models complement each other. Thus, the integrated model integrates one or more of the variations of the user-independent neighborhood model as represented by EQs. 10-15 the SVD++ model as represented by EQ. 24. Thus, the integrated model in effect sums the predictions of the user-independent neighborhood model and the SVD++ model, thereby allowing neighborhood and factor models to enrich each other, as follows:

$$\hat{r}_{ui} = \mu + b_u + b_i + q_i^T \left( p_u + |N(u)|^{-n} \sum_{j \in N(u)} y_j \right) + \quad \text{EQ. 25}$$
$$|R^k(i;u)|^{-n} \sum_{j \in R^k(i;u)} (r_{uj} - b_{uj})\omega_{ij} + |N^k(i;u)|^{-\frac{1}{2}} \sum_{j \in N^k(i;u)} c_{ij},$$
$$0 < n < 1$$

Although EQ. 25 illustrates an example version of the integrated model by combining the version of the user-independent neighborhood model of EQ. 15 with the SVD++ model, other versions of the integrated model can be implemented by combining a different version of the user-independent neighborhood model (i.e., one of EQs. 10-14) with the SVD++ model.

In a sense, the integrated model provides a three-tier model for recommendations. The first tier, $\mu + b_u + b_i$, describes general properties of the selected item i and the selected user u without accounting for any involved interactions. For example, this tier could argue that "The Sixth Sense" movie is known to be good, and that the rating scale of our user, Joe, tends to be just on average. The next tier, $$q_i^T \left( p_u + |N(u)|^{-n} \sum_{j \in N(u)} y_j \right),$$

provides the interaction between the user profile and the item profile. In the above example, it may find that "The Sixth Sense" and Joe are rated high on the Psychological Thrillers scale. The final tier, $$|R^k(i;u)|^{-n} \sum_{j \in R^k(i;u)} (r_{uj} - b_{uj})\omega_{ij} + |N^k(i;u)|^{-n} \sum_{j \in N^k(i;u)} c_{ij},$$

contributes fine grained adjustments that are hard to profile, such as the fact that Joe rated low the related movie "Signs".

The integrated model parameters can be determined by minimizing the associated regularized squared error function through gradient descent. Recall that $e_{ui}$ is defined as the difference between the actual user preference $r_{ui}$ and the predicted user preference (i.e., $r_{ui} - \hat{r}_{ui}$). Accordingly, the recommender system loops over all known ratings in K and for a given training case $r_{ui}$, the recommender system modifies the parameters by moving in the opposite direction of the gradient, yielding:

$$b_u \leftarrow b_u + \gamma_1 \cdot (e_{ui} - \lambda_6 \cdot b_u) \quad \text{EQ. 26}$$

$$b_i \leftarrow b_i + \gamma_1 \cdot (e_{ui} - \lambda_6 \cdot b_i) \quad \text{EQ. 27}$$

$$p_u \leftarrow p_u + \gamma_2 \cdot (e_{ui} \cdot q_i - \lambda_7 \cdot p_u) \quad \text{EQ. 28}$$

$$q_i \leftarrow q_i + \gamma_2 \cdot \left( e_{ui} \cdot \left( p_u + |N(u)|^{-n} \sum_{j \in N(u)} y_j \right) - \lambda_7 \cdot q_i \right) \quad \text{EQ. 29}$$

$$\forall j \in N(u) : y_j \leftarrow y_j + \gamma \cdot (|N(u)|^{-n} \cdot e_{ui} \cdot q_i - \lambda_7 \cdot y_j) \quad \text{EQ. 30}$$

$$\forall j \in R^k(i;u): \quad \text{EQ. 31}$$
$$\omega_{ij} \leftarrow \omega_{ij} + \gamma_3 \cdot (|R^k(i;u)|^{-n} \cdot e_{ui} \cdot (r_{uj} - b_{uj}) - \lambda_8 \cdot \omega_{ij})$$

$$\forall j \in N^k(i;u) : c_{ij} \leftarrow c_{ij} + \gamma_3 \cdot (|N^k(i;u)|^{-n} \cdot e_{ui} - \lambda_8 \cdot c_{ij}) \quad \text{EQ. 32}$$

The inventors found the following meta parameters to be effective for the example Netflix data: $\gamma_1 = \gamma_2 0.007$, $\gamma_3 = 0.007$, $\lambda_6 = 0.0005$, $\lambda_7 = \lambda_8 = 0.015$, and a neighborhood size k set to 300 run for thirty (30) iterations until convergence is achieved. In contrast to the user-independent neighborhood model, there is no significant benefit in increasing k in the integrated model, as adding neighbors covers more global information, which the latent factors already capture adequately. The iterative process runs for around 30 iterations till convergence.

By coupling neighborhood and latent factor models together, and recovering signal from implicit feedback, accuracy of results is improved beyond other methods. Recall that unlike SVD++, both the user-independent neighborhood model and the asymmetric SVD allow a direct explanation of their recommendations, and do not require re-training the model for handling new users. Hence, when explainability is preferred over accuracy, a recommender system can use the guidelines provided herein to integrate the asymmetric SVD model in place of the SVD++ mode in the integrated model with the user-independent neighborhood model, thereby improving accuracy of the individual models while still maintaining the ability to reason about recommendations to end users.

FIG. 6 summarizes the process 210 (FIG. 2) for implementing the integrated model in a collaborative filtering technique for predicting a recommendation rating $r_{ui}$ for a selected item i and a selected user u. At block 602, the recommender system determines a baseline estimates $b_{ui}(\mu + b_u + b_i)$ of the recommendation rating based on the observed deviations of the selected user u and the selected item i from the average as described above with reference to EQs. 1 and 2. At block 604, the recommender system determines the component of the recommendation rating contributed by the user-independent neighborhood model (e.g., $$|R^k(i;u)|^{-n} \sum_{j \in R^k(i;u)} (r_{uj} - b_{uj})\omega_{ij} + |N^k(i;u)|^{-n} \sum_{j \in N^k(i;u)} c_{ij} \right).$$

At block 606, the recommender system determines the component of the recommendation rating contributed by the SVD-based model, e.g., $$q_i^T \left( p_u + |N(u)|^{-n} \sum_{j \in N(u)} y_j \right).$$

Further, although FIG. 6 is illustrated as a sequence of blocks relating to the corresponding processes, no order is intended in determining these parameters. Rather, it will be appreciated that only the non-parameters (i.e., the fixed sets N(u) and R(u)) are known before the learning process initiates and all of the weights and other parameters of both the SVD component and the neighborhood component typically are learned simultaneously using the regularized least squares problem and gradient solver. At block 608, the recommender system determines the recommender rating for the selected item i and the selected user u using the baseline estimates and these two components as described with reference to EQ. 25 or a similarly formed model based on a version of the user-independent neighborhood model and one of the asymmetric SVD model or the SVD++ model.

FIG. 7 shows an illustrative embodiment of a general computer system 700 in accordance with at least one embodiment of the present disclosure. The computer system 700 can include a set of instructions that can be executed to cause the computer system 700 to perform any one or more of the methods or computer based functions disclosed herein. The computer system 700 may operate as a standalone device or may be connected, e.g., using a network, to other computer systems or peripheral devices. In at least one embodiment, the computer system 700 represents a recommender system implementing the techniques described herein, such as the multimedia server 112 implementing the recommender application 118 of FIG. 1.

In a networked deployment, the computer system may operate in the capacity of a server or as a client user computer in a server-client user network environment, or as a peer computer system in a peer-to-peer (or distributed) network environment. The computer system 700 can also be implemented as or incorporated into, for example, a STB device. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

The computer system 700 may include a processor 702, e.g., a central processing unit (CPU), a graphics processing unit (GPU), or both. Moreover, the computer system 700 can include a main memory 704 and a static memory 706 that can communicate with each other via a bus 708. As shown, the computer system 700 may further include a video display unit 710, such as a liquid crystal display (LCD), an organic light emitting diode (OLED), a flat panel display, a solid state display, or a cathode ray tube (CRT). Additionally, the computer system 700 may include an input device 712, such as a keyboard, and a cursor control device 714, such as a mouse. The computer system 700 can also include a disk drive unit 716, a signal generation device 718, such as a speaker or remote control, and a network interface device 720.

In a particular embodiment, as depicted in FIG. 7, the disk drive unit 716 may include a computer-readable medium 722 in which one or more sets of instructions 724, e.g. software, can be embedded. Further, the instructions 724 may embody one or more of the processes or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media. The network interface device 720 can provide connectivity to a network 726, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system so as to manipulate one or more processors of the computer system to perform the corresponding actions. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions. While the computer-readable medium is shown to be a single medium, the term "computer-readable medium" includes a single medium or multiple media, such as a centralized or distributed database, and/or associated caches, memories, hard drives, and servers that store one or more sets of instructions. The term "computer-readable medium" shall also include any medium that is capable of storing a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writeable memory. Additionally, the computer-readable medium can include a magneto-optical or optical medium, such as a disk or tapes or other storage device.

What is claimed is:

1. A method comprising:
determining, for a selected user, a recommendation rating for a selected item based on a neighborhood model and a baseline estimate, wherein the neighborhood model utilizes user-independent weighting of user ratings of other items, wherein the baseline estimate comprises a determined deviation of ratings made by the selected user from ratings made by a set of users and a determined deviation of ratings of the selected item from ratings of items of a set of items, and wherein the recommendation rating is determined by a processor; and
recommending the selected item to the selected user responsive to the recommendation rating.

2. The method of claim 1, wherein the neighborhood model comprises a first component represented at least partially by the expression:

$$\sum_{j \in R(u)} (r_{uj} - b_{uj})\omega_{ij}$$

whereby u represents the selected user, i represents the selected item, R(u) represents a set of ratings of items made by the selected user, $r_{uj}$ represents a rating assigned to an item j of the set of ratings R(u) by the selected user, $\omega_{ij}$ represents a baseline rating assigned to the item j by the selected user, and $\omega_{ij}$ represents a user-independent weight associated with the selected item and the item j.

3. The method of claim 2,
wherein the recommendation rating comprises a sum of the first component and a second component determined based on the baseline estimate.

4. The method of claim 1, wherein the neighborhood model is represented at least partially by the expression:

$$\sum_{j \in R(u)} (r_{uj} - b_{uj})\omega_{ij} + \sum_{j \in N(u)} c_{ij}$$

whereby u represents the selected user, i represents the selected item, R(u) represents a set of items for which the selected user has provided an explicit preference feedback, $r_{uj}$ represents a rating assigned to an item j of the set of ratings R(u) by the selected user, $b_{uj}$ represents a baseline rating assigned to the item j by the selected user, $\omega_{ij}$ represents a user-independent weight associated with the selected item and the item j, N(u) represents a set of items for which the selected user has provided implicit preference feedback, and $C_{ij}$ represents an implicit preference for the item j by the selected user.

5. The method of claim 1, wherein the neighborhood model is represented at least partially by the expression:

$$|R(u)|^{-n} \sum_{j \in R(u)} (r_{uj} - b_{uj})\omega_{ij} + |N(u)|^{-n} \sum_{j \in N(u)} c_{ij},$$
$$0 < n < 1$$

whereby u represents the selected user, i represents the selected item, R(u) represents a set of items for which the selected user has provided an explicit preference feedback, $r_{uj}$ represents a rating assigned by the selected user to an item j of the set of items, $b_{uj}$ represents a baseline rating assigned to the item j by the selected user, $\omega_{ij}$ represents a user-independent weight associated with the selected item and the item j, N(u) represents a set of items for which the selected user has provided implicit preference feedback, and $C_{ij}$ represents an implicit preference for the item j by the selected user.

6. The method of claim 1, wherein the neighborhood model is represented at least partially by the expression:

$$|R^k(i;u)|^{-n} \sum_{j \in R^k(i;u)} (r_{uj} - b_{uj})\omega_{ij} + |N^k(i;u)|^{-n} \sum_{j \in N^k(i;u)} c_{ij},$$
$$0 < n < 1$$

whereby u represents the selected user, i represents the selected item, $R^k$(i;u) represents a set of k items identified as most similar to the selected item and for which the selected user has provided an explicit preference feedback, $r_{uj}$ represents a rating assigned to an item j of the set of ratings R(u) by the selected user, $b_{uj}$ represents a baseline rating assigned to the item j by the selected user, $w_u$ represents a user-independent weight associated with the selected item and the item j, $N^k$(i;u) represents a set of k items identified as most similar to the selected item and for which the selected user has provided implicit preference feedback, and $C_{ij}$ represents an implicit preference for the item j by the selected user.

7. The method of claim 1, wherein determining the recommendation rating for the selected item comprises determining the recommendation rating further based on a latent factor model that utilizes singular value decomposition (SVD) implementing implicit preference feedback from the selected user.

8. The method of claim 7, wherein the latent factor model is represented at least partially by the expression:

$$q_i^T \left( p_u + |N(u)|^{-n} \sum_{j \in N(u)} y_j \right),$$
$$0 < n < 1$$

whereby u represents the selected user, i represents the selected item, $q_i$ represents an items-factor vector for the selected item, $p_u$ represents a user-factors vector determined from explicit preference feedback, N(u) represents a set of items for which the selected user has provided implicit preference feedback, and $y_j$ represents an SVD-derived parameter for an item j of the set of items.

9. The method of claim 1, wherein the recommending of the selected item to the selected user responsive to the recommendation rating comprises at least one of recommending the selected item based on a relationship between the recommendation rating and a predetermined rating threshold and recommending the selected item based on a ranking within a list of recommendation ratings for a set of items.

10. The method of claim 1, wherein:
recommending the selected item to the selected user comprises providing, via a graphical user interface, a graphical representation of a recommendation of the selected item; and
the method further comprises:
facilitating provision of the selected item to the selected user responsive to user input received via the graphical user interface and indicating acceptance of the selected item.

11. The method of claim 10, wherein:
the selected item comprises a multimedia program;
the graphical user interface is associated with an electronic programming guide (EPG) of a multimedia receiver; and
facilitating provision of the selected item to the selected user comprises transmitting, via a network, data representative of the multimedia program to the multimedia receiver.

12. A method comprising:
determining, for a selected user, a recommendation rating for a selected item based on a latent factor model and a baseline estimate, wherein the latent factor model utilizes singular value decomposition (SVD) implementing implicit preference feedback from the selected user, wherein the baseline estimate comprises a determined deviation of ratings made by the selected user from ratings made by a set of users and a determined deviation of ratings of the selected item from ratings of items of a set of items, and wherein the recommendation rating is determined by a processor; and recommending the selected item to the selected user responsive to the recommendation rating.

13. The method of claim 12, wherein the latent factor model is represented at least partially by the expression:

$$q_i^T \left( p_u + |N(u)|^{-n} \sum_{j \in N(u)} y_j \right),$$
$$0 < n < 1$$

whereby u represents the selected user, i represents the selected item, $q_i$ represents an items-factor vector for the selected item, $p_u$ represents a user-factors vector determined from explicit preference feedback, N(u) represents a set of items for which the selected user has provided implicit preference feedback, and $y_j$ represents an SVD-derived parameter for an item j of the set of items.

14. The method of claim 12, wherein the latent factor model is represented at least partially by the expression:

$$q_i^T \left( |R(u)|^{-n} \sum_{j \in R(u)} (r_{uj} - b_{uj}) x_j + |N(u)|^{-n} \sum_{j \in N(u)} y_j \right),$$
$$0 < n < 1$$

whereby u represents the selected user, i represents the selected item, $q_i$ represents an items-factor vector for the selected item, R(u) represents a set of items for which the selected user has provided an explicit preference feedback, $r_{uj}$ represents a rating assigned by the selected user to an item j of the set of items, $b_{uj}$ represents a baseline rating assigned to the item j by the selected user, N(u) represents a set of items for which the selected user has provided implicit preference feedback, and $x_j$ and $y_j$ represent SVD derived parameters for an item j of the set of items.

15. The method of claim 12, wherein the selected item comprises a multimedia program.

16. The method of claim 12, wherein:
recommending the selected item to the selected user comprises providing, via a graphical user interface, a graphical representation of a recommendation of the selected item; and
the method further comprises:
facilitating provision of the selected item to the selected user responsive to user input received via the graphical user interface and indicating acceptance of the selected item.

17. The method of claim 16, wherein:
the selected item comprises a multimedia program;
the graphical user interface is associated with an electronic programming guide (EPG) of a multimedia receiver; and
facilitating provision of the selected item to the selected user comprises transmitting, via a network, data representative of the multimedia program to the multimedia receiver.

18. A recommender system comprising:
one or more processors; and
a computer readable medium accessible to the one or more processors and storing a set of executable instructions, the set of executable instructions comprising:
instructions configured to manipulate the one or more processors to determine, for a selected user, a recommendation rating for a selected item based on a neighborhood model and a baseline estimate, wherein the neighborhood model utilizes user-independent weighting of user ratings of other items, and wherein the baseline estimate comprises a determined deviation of ratings made by the selected user from ratings made by a set of users and a determined deviation of ratings of the selected item from ratings of items of a set of items; and
instructions configured to manipulate the one or more processors to recommend the selected item to the selected user responsive to the recommendation rating.

19. The recommender system of claim 18, wherein the neighborhood model is represented at least partially by the expression:

$$\sum_{j \in R(u)} (r_{uj} - b_{uj}) \omega_{ij}$$

whereby u represents the selected user, i represents the selected item, R(u) represents a set of ratings of items made by the selected user, $r_{uj}$ represents a rating assigned to an item j of the set of ratings R(u) by the selected user, $b_{uj}$ represents a baseline rating assigned to the item j by the selected user, and $\omega_{ij}$ represents a user-independent weight associated with the selected item and the item j.

20. The recommender system of claim 18, wherein the neighborhood model is represented at least partially by the expression:

$$\sum_{j \in R(u)} (r_{uj} - b_{uj}) \omega_{ij} + \sum_{j \in N(u)} c_{ij}$$

whereby u represents the selected user, i represents the selected item, R(u) represents a set of items for which the selected user has provided an explicit preference feedback, $r_{uj}$ represents a rating assigned to an item j of the set of ratings R(u) by the selected user, $b_{uj}$ represents a baseline rating assigned to the item j by the selected user, $\omega_{ij}$ represents a user-independent weight associated with the selected item and the item j, N(u) represents a set of items for which the selected user has provided implicit preference feedback, and $c_{ij}$ represents an implicit preference for the item j by the selected user.

21. The recommender system of claim 18, wherein the neighborhood model is represented at least partially by the expression:

$$|R(u)|^{-n} \sum_{j \in R(u)} (r_{uj} - b_{uj}) \omega_{ij} + |N(u)|^{-n} \sum_{j \in N(u)} c_{ij},$$
$$0 < n < 1$$

whereby u represents the selected user, i represents the selected item, R(u) represents a set of items for which the selected user has provided an explicit preference feedback, $r_{uj}$ represents a rating assigned by the selected user to an item j of the set of items, $b_{uj}$ represents a baseline rating assigned to the item j by the selected user, $\omega_{ij}$ represents a user-independent weight associated with the selected item and the item j, N(u) represents a set of items for which the selected user has provided implicit preference feedback, and $c_{ij}$ represents an implicit preference for the item j by the selected user.

22. The recommender system of claim 18, wherein the neighborhood model is represented at least partially by the expression:

$$|R^k(i;u)|^{-n} \sum_{j \in R^k(i;u)} (r_{uj} - b_{uj})\omega_{ij} + |N^k(i;u)|^{-n} \sum_{j \in N^k(i;u)} c_{ij},$$

$$0 < n < 1$$

whereby u represents the selected user, i represents the selected item, $R^k(i;u)$ represents a set of k items identified as most similar to the selected item and for which the selected user has provided an explicit preference feedback, $r_{uj}$ represents a rating assigned to an item j of the set of ratings R(u) by the selected user, $b_{uj}$ represents a baseline rating assigned to the item j by the selected user, $\omega_{ij}$ represents a user-independent weight associated with the selected item and the item j, $N^k(i;u)$ represents a set of k items identified as most similar to the selected item and for which the selected user has provided implicit preference feedback, and $c_{ij}$ represents an implicit preference for the item j by the selected user.

23. The recommender system of claim 18, wherein the instructions configured to manipulate the one or more processors to determine the recommendation rating for the selected item comprise instructions configured to manipulate the one or more processors to determine the recommendation rating further based on a latent factor model that utilizes singular value decomposition (SVD) implementing implicit preference feedback from the selected user.

24. The recommender system of claim 23, wherein the latent factor model is represented at least partially by the expression:

$$q_i^T \left( p_u + |N(u)|^{-n} \sum_{j \in N(u)} y_j \right),$$

$$0 < n < 1$$

whereby u represents the selected user, i represents the selected item, $q_i$ represents an items-factor vector for the selected item, $q_i$ represents a user-factors vector determined from explicit preference feedback, N(u) represents a set of items for which the selected user has provided implicit preference feedback, and $y_j$ represents an SVD-derived parameter for an item j of the set of items.

25. The recommender system of claim 23, wherein the instructions configured to manipulate the one or more processors to recommend the selected item to the selected user comprise instructions configured to manipulate the one or more processors to initiate a provision of a graphical representation of a recommendation of the selected item via a graphical user interface; and wherein the set of instructions further comprises:

instructions configured to manipulate the one or more processors to receive, via the graphical user interface, user input indicating acceptance of the selected item; and instructions configured to manipulate the one or more processors to facilitate provision of the selected item to the selected user responsive to the user input.

26. The recommender system of claim 25, wherein:

the selected item comprises a multimedia program;

the graphical user interface comprises an electronic programming guide (EPG) of a multimedia receiver; and the instructions to manipulate the one or more processors to facilitate provision of the selected item to the selected user comprise instructions to manipulate the one or more processors to provide data representative of the multimedia program to a network for transmission to the multimedia receiver.

27. The recommender system of claim 18, wherein:

the recommender system comprises a video server;

the selected user comprises a user of a multimedia receiver connected to the video server via a network; and the selected item comprises a multimedia program transmissible from the video server to the multimedia receiver via the network.

28. A recommender system comprising:

one or more processors; and a computer readable medium accessible to the one or more processors and storing a set of executable instructions, the set of executable instructions comprising:

instructions configured to manipulate the one or more processors to determine, for a selected user, a recommendation rating for a selected item based on a latent factor model and a baseline estimate, wherein the latent factor model utilizes singular value decomposition (SVD) implementing implicit preference feedback from the selected user, and wherein the baseline estimate comprises a determined deviation of ratings made by the selected user from ratings made by a set of users and a determined deviation of ratings of the selected item from ratings of items of a set of items; and instructions configured to manipulate the one or more processors to recommend the selected item to the selected user responsive to the recommendation rating.

29. The recommender system of claim 28, wherein the latent factor model is represented at least partially by the expression:

$$q_i^T \left( p_u + |N(u)|^{-n} \sum_{j \in N(u)} y_j \right),$$

$$0 < n < 1$$

whereby u represents the selected user, i represents the selected item, $q_i$ represents an items-factor vector for the selected item, $p_u$ represents a user-factors vector determined from explicit preference feedback, N(u) represents a set of items for which the selected user has provided implicit preference feedback, and $y_j$ represents an SVD-derived parameter for an item j of the set of items.

30. The recommender system of claim 28, wherein the latent factor model is represented at least partially by the expression:

$$q_i^T\left(|R(u)|^{-n}\sum_{j\in R(u)}(r_{uj}-b_{uj})x_j + |N(u)|^{-n}\sum_{j\in N(u)}y_j\right),$$

$$0 < n < 1$$

whereby u represents the selected user, i represents the selected item, $q_i$ represents an, items-factor vector for the selected item, R(u) represents a set of items for which the selected user has provided an explicit preference feedback, $r_{uj}$ represents a rating assigned by the selected user to an item j of the set of items, $b_{uj}$ represents a baseline rating assigned to the item j by the selected user, N(u) represents a set of items for which the selected user has provided implicit preference feedback, and $x_j$ and $y_j$ represent SVD derived parameters for an item j of the set of items.

31. The recommender system of claim 28, wherein the instructions configured to manipulate the one or more processors to recommend the selected item to the selected user comprise instructions configured to manipulate the one or more processors to initiate a provision of a graphical representation of a recommendation of the selected item via a graphical user interface; and wherein the set of instructions further comprises:
instructions configured to manipulate the one or more processors to receive, via the graphical user interface, user input indicating acceptance of the selected item; and
instructions configured to manipulate the one or more processors to facilitate provision of the selected item to the selected user responsive to the user input.

32. The recommender system of claim 31, wherein:
the selected item comprises a multimedia program;
the graphical user interface comprises an electronic programming guide (EPG) of a multimedia receiver; and
the instructions to manipulate the one or more processors to facilitate provision of the selected item to the selected user comprise instructions to manipulate the one or more processors to provide data representative of the multimedia program to a network for transmission to the multimedia receiver.

33. The recommender system of claim 28, wherein:
the recommender system comprises a video server;
the selected user comprises a user of a multimedia receiver connected to the video server via a network; and
the selected item comprises a multimedia program transmissible from the video server to the multimedia receiver via the network.

* * * * *